United States Patent [19]

Olmsted

[11] 4,065,108

[45] Dec. 27, 1977

[54] NON-RETURN VALVE FOR MOTTLE CHARGE IN PLASTIC INJECTION MOLDING MACHINE

[75] Inventor: Bernie A. Olmsted, East Longmeadow, Mass.

[73] Assignee: Package Machinery Company, East Longmeadow, Mass.

[21] Appl. No.: 740,933

[22] Filed: Nov. 11, 1976

[51] Int. Cl.² .............................................. B29B 1/06
[52] U.S. Cl. ...................................... 366/76; 366/78; 366/87
[58] Field of Search .................... 259/191, 192, 193, 9, 259/10, 97, 25, 26, 45, 46; 425/207, 208, 376, 247

[56] References Cited

U.S. PATENT DOCUMENTS

| | | | |
|---|---|---|---|
| 3,131,433 | 5/1964 | Volland | 259/191 |
| 3,698,694 | 10/1972 | Zeug | 259/191 |
| 3,945,786 | 3/1976 | Bishop | 425/208 |
| 3,946,999 | 3/1976 | Nussbaumer | 259/191 |

*Primary Examiner*—Robert W. Jenkins
*Attorney, Agent, or Firm*—McCormick, Paulding & Huber

[57] ABSTRACT

The charge forming barrel has a screw slidably and rotatably received therein, and the screw is specially suited for successively forming a mottle charge, a valve stud being mounted on the forward end of the screw, and this stud cooperating with a ring shaped non-return valve to close off rearward flow of the plasticized ingredients comprising the charge. The valve closes in a sliding or shearing action which avoids the propensity for such pellets to prevent the full closure of the non-return valve during the period of the cycle where a charge is injected into the mold cavities, and prior to forming of the next succeeding charge.

2 Claims, 4 Drawing Figures

U.S. Patent  Dec. 27, 1977  4,065,108
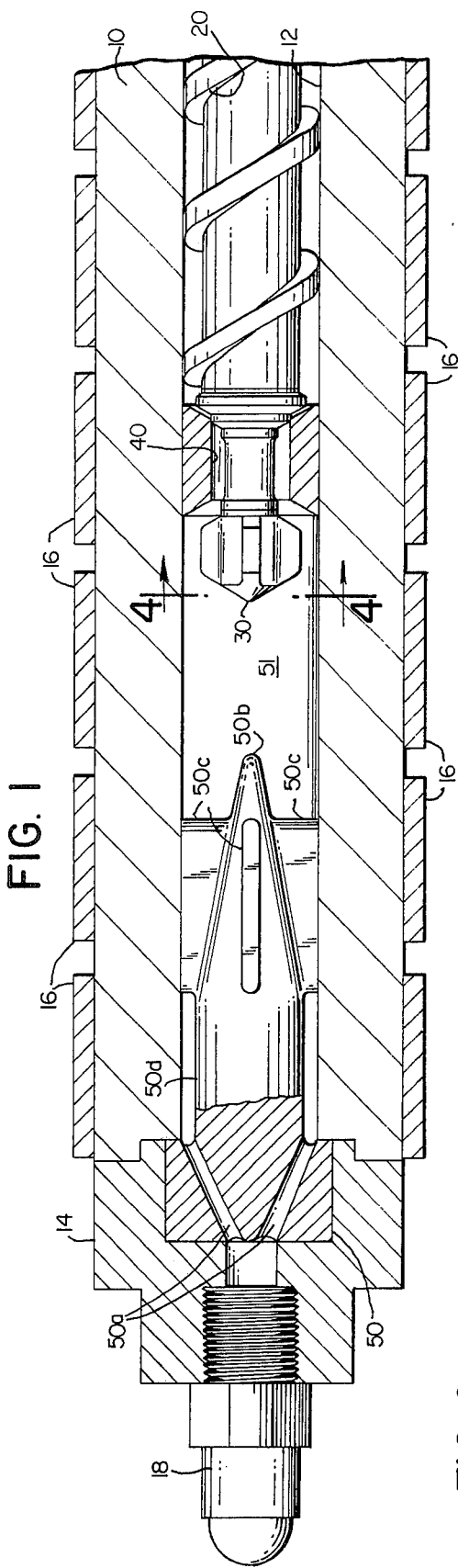
FIG. 1
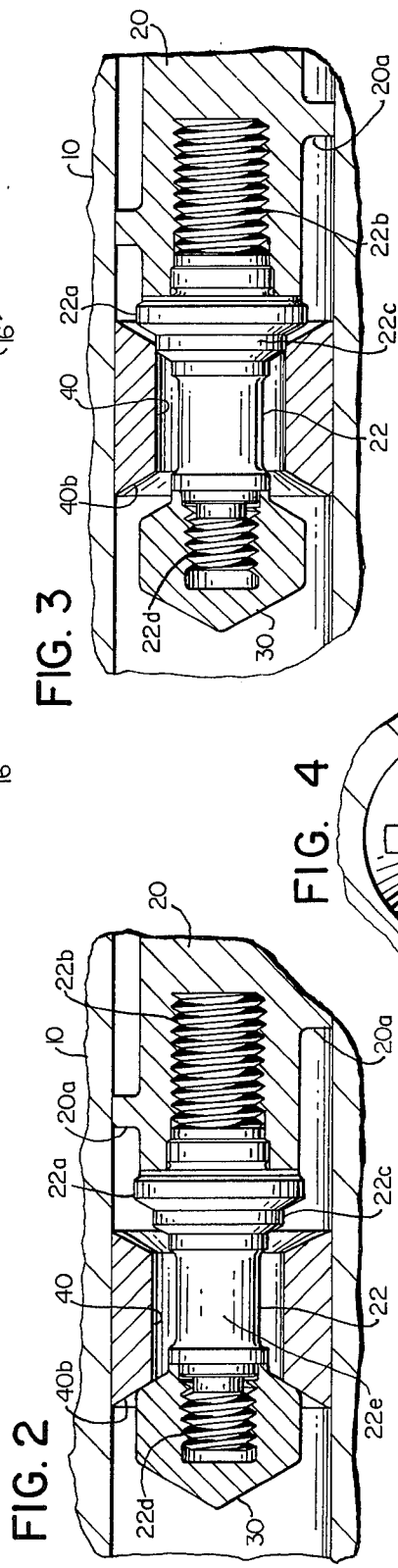
FIG. 3
FIG. 2
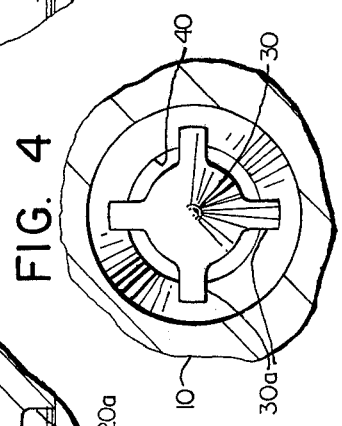
FIG. 4

NON-RETURN VALVE FOR MOTTLE CHARGE IN PLASTIC INJECTION MOLDING MACHINE

This invention relates generally to plastic injection molding machines, and deals more particularly with that portion of such a machine where the charge of plasticized material is formed for injection into the mold and cavities.

In a typical injecton molding machine, the thermoplastic material, usually in the form of pellets, together with any pigment material and softening agents are collectively deposited in a hopper for feed into an elongated barrel. The forward end of the barrel has an orifice head, which defines one end of a chamber into which the molten material is fed by a screw conveyor or feeder rotatably and slidably received in the barrel bore. The screw not only rotates so as to feed material along the bore from the hopper into the charge forming chamber between the screw and orifice head, but the screw is also reciprocable so as to act as a piston or ram to force the plasticized material out of the chamber through the nozzle and into a mold cavity or runners communicating with several such cavities.

In order to prevent the plasticized charge of material under pressure in the chamber from moving back past the piston end of the feed screw, a non-return valve, usually in the form of an annular sleeve or shuttle, is slidably received in the barrel bore and is adapted for limited axial movement on a valve stud provided at the forward end of the feed screw. The valve stud has a necked down portion which cooperates with the non-return valve sleeve or shuttle, the forward end of the shuttle being engageably with a rearwardly facing portion of the valve stud to define an open position for the valve. The rearwardly facing end portion of the prior art shuttle valve is engageable with a forwardly facing portion of the valve stud, or the front end of the screw to define the valve closed position.

The injection molding of certain products, to have a mottled or marbleized appearance, requires the use of pellets of contrasting color in the hopper, some of which pellets are not to be melted until just prior to or during injection in order to preserve the color variation or marbelized appearance in the product.

Thus, it is desirable to use a shorter feed screw so that some of the pellets will not be fully melted upon passage through the non-return valve into the charge forming chamber. Consequently, some such pellets are apt to become lodged between the rearwardly facing end portion of the conventional shuttle valve and the valve stud; or end portion of the screw. This tendency for some pellets to be incompletely melted in this area can prevent the conventional shuttle valve from closing.

In such a situation, the plasticized charge tends to flow back between the convolutions of the screw and reduces the pressure below that desired upon injection of the charge into the mold cavities. Further, an insufficent quantity of material is likely to be injected, and the condition of the next suceeding charge adversely effected by reason of the charge bleeding back through the partially open non-return valve into the fluted area between the screw convolutions.

The aim of the present invention is to provide a non-return valve which is adapted to slide into its closed position on a raised cylindrically shaped land defined for this purpose on the valve stud at the forward end of the screw.

Thus, in its open position, the unique shuttle valve described herein cooperates with the valve stud in the forward end of the screw in much the same manner as in a prior art shuttle valve. However, when the charge has been formed in the chamber and when the screw conveyor is moved forwardly to inject the charge into the mold cavities, the valve closes in a unique sliding or shearing action in cooperation with a complementary shaped portion of the valve stud in order to preclude the trapping of unmelted pellets between the valve surfaces.

As a result, during the forward or injection stroke of the screw, all of the plasticized ingredients and the pellet material is forced though the chamber into the nozzle. A spreader of fixed torpedo may be provided in the forward end of the barrel to assist in final melting of the pellets while preserving the desired marbleized or mottled color in the charge as it enters the mold cavities.

FIG. 1 is a longitudinal sectional view through the forward end of a barrel of the type used in an injection molding machine, and illustrates the screw moving forwardly from its rearmost position with the non-return or shuttle valve closed so that such forward movement of the screw will inject the charge through the nozzle and into the runners and into the mold cavities (not shown).

FIG. 2 is a longitudinal sectonal view at the front end of the screw and shows the valve stud in elevation with the shuttle valve element in open position.

FIG. 3 is a view similar to FIG. 2, but illustrating the shuttle valve element in its closed position.

FIG. 4 is a cross sectional view taken generally on the line 4—4 of FIG. 1.

Referring now to the drawing in greater detail, that portion of an injection molding machine in which the present invention resides is shown in FIG. 1 as comprising a fixed barrel 10, in which a cylindrical bore 12 is defined. Only the forward end of the barrel 10 is shown, and a nozzle adapter or head 14 is provided on this forward end of the barrel 10, being attached thereto by suitable means. A nozzle 18 is provided in the adapter 14 and communicates with the runners or other passageways so that the plastic material can be injected into the mold cavities (not shown) in a conventional manner.

Still with reference to the environment of the present invention, a typical plastic injection molding machine usually includes a hopper (not shown) opening into the barrel bore to introduce the material to be plasticized. As mentioned previously, this material is usually provided in the form or pellets, and may also include pigment material for providing a product of predetermined color, and may also include agents for the purpose of facilitating the plasticizing of the thermoplastic pellets.

The production of mottled or marbleized plastic goods requires the use of pellets of different color, some of which may melt at different temperatures and/or pressure than others. Heaters 16, 16 for melting the pellet material are provided around the barrel 10, and it is noted that heaters might also be provided in the rotating feed screw 20. These and other details of construction are not specifically shown in the drawing since they are conventional in injecton molding machines.

Conventional hydraulic means is also provided for thrusting the feed screw 20 forwardly in the bore 12 in the injection stroke, the screw then acting as a ram, and other conventional drive means is used for rotating the screw to advance the materials being plasticized in the forward direction through the valve structure to be described and into a chamber defined between the forward end of the feed screw and the adapter 14. Thus, the screw 20 is rotated in the bore 12 to feed the thermoplastic material forwardly in the bore while the material is being plasticized, and then the screw is rammed forwardly to inject a plasticized charge of the material collected in the aforesaid chamber. The return or rearward motion of the screw is caused by the pressure of the plasticized material being fed into the said chamber between the adapter 14 and the forward end of the then rotating screw 20.

The non-return valve of this invention, which is especially adapted to handle non-melted particles or pellets while closing during injection (and which the conventional non-return valve cannot do) still operates in the conventional valve manner. That is, as with the conventional valve, the non-return valve element or shuttle 40 is shifted forwardly relative to the screw 20 to the open position by the flow of material being advanced by the rotating screw. It only shifts rearwardly relative to the screw when the screw is rammed forwardly in the injection stroke, thus to prevent the plasticized material from moving back along the screw. As in the conventional valve, when the shuttle element 40 is forward (FIG. 2) relative to the screw 20, the non-return valve is open. When the shuttle is rearward relative to the screw (FIG. 3) the non-return valve is closed.

From this, and from the following description it will become apparent that the non-return valve of this invention can be used without sacrifice on injecton molding machines making conventional products or multicolor "mottled" products.

The present invention relates particularly to the construction of the valve stud 22 provided at the forward end of the feed screw, and also to the manner in which a portion of this valve stud cooperates with the non-return valve ring or shuttle 40. These portions of the structure shown in the drawing are designed so as to achieve the object stated previously, and to permit the formation of mottled or marbleized product in the mold cavities. The inside of the adapter 14 is prefereably fitted with a fixed torpedo shaped body 50 which will also be described.

With particular reference to FIG. 2, the shuttle valve member 40 is there shown in its open position such that the plasticized ingredients referred to previously are free to flow between the valve stud 22 and the annular valve element 40 as the charge of material is formed in the chamber described above. The convolutions of the screw conveyor are illustrated at 20a, and the valve stud is illustrated generally at 22. The valve stud includes a large diameter portion 22a and a rearwardly extending threaded portion 22b which is received in a tapped opening in the front end of the screw 20. Just forward of the portion 22a a cylindrical land 22c is provided on the stud 22 for a sliding fit with the inside diameter of the shuttle valve member 40 in order to define a closed position for the valve as best shown in FIG. 3.

The valve stud 22 also has a reduced diameter 22e which is radially spaced from the inside of this annular valve element 40 in order to provide an annular passageway for the flow of the partially melted thermoplastic material when the valve is in the open position as illustrated in FIG. 2. The valve stud 22 also includes a forwardly extending threaded projection 22d which is adapted to receive a detachable nose or extension 30 on the valve stud as best shown in FIG. 4. The nose 30 has a plurality (four shown) of circumaxially spaced radially extending wings 30a which define longitudinal flutes between them. These wings have rearwardly facing stop surfaces adapted to abut the forwardly facing end of the shuttle 40 in the open position for the valve. The nose flutes provide passage for the paritally melted thermoplastic material into the shot or charge chamber 51 in the barrel bore 12 between the front of the screw 20 and the nozzle head 14.

As mentioned previously, a fixed torpedo shaped member 50 is provided in the forward end of the bore and cooperates with the adapter head 14 to define a plurality of individual passageways 50e at the entrance end of the nozzle 18. The said torpedo member 50 has a tail cone 50b in which circumaxially spaced fins 50c are provided to extend radially outwardly to the wall of the barrel bore 12. A central portion of this fixed torpedo member 50 is of cylindrical configuration as illustrated generally at 50d and is spaced from the wall of the bore. During the injection stroke of the screw, the charge being injected flows forwardly over the tail cone 50b and between the fins 50c into the annular passage between the central portion 50d of the torpedo and the wall of the barrel bore 12 and finally into the passages 50a to the nozzle 18.

It will be seen that the torpedo 50 acts as a spreader which brings the charge into relatively thin layer contact with the heated wall of the bore, especially around the central portion 50d of the torpedo. This will assure final melting of the pellets of different color only just prior to entry into the nozzle. The discrete passages 50a do not permit complete mixing of the various colors in the melt before nozzle entry and thus color variation is preserved in the product which may be referred to as "mottled" or "marbleized".

Therefore, by incorporation of the non-return valve of this invention it is possible to permit some of the colored thermoplastic pellets to pass through the non-return valve before melting. Due to the shear-like closing of the non-return shuttle 40 on the valve stud portion 22c, such unmelted pellets cannot prevent closing of the valve and the consequent loss in charge volume and/or pressure. This is essential to preserve final melting "to the last instant" and thus to provide for the mottled color product as described.

I claim:

1. In a plastic injection molding machine having a heated barrel, a screw in the barrel bore which is rotated to advance thermoplastic material, including pellets, toward a nozzle and thus to build up a charge of such material under pressure between the nozzle and front end of the screw, the screw being adapted to slide rearwardly in the bore from the pressure of such charge and being further adapted to be thrust forwardly and thus force the collected charge through the nozzle; an improved non-return valve comprising a stud on the front end of the screw having a forwardly extending reduced diameter portion and a larger diameter cylindrical rear portion and also having an enlarged diameter nose secured to its front end, flow passage means for the thermoplastic material and defined at least in part by said nose, and an annular valve shuttle engaging the wall of the barrel bore but slidable therein, the inside diameter of the shuttle providing a close sliding fit over the corresponding diameter cylindrical rear portion on the stud, said shuttle defining said flow passage means with said nose and providing space around the reduced diameter portion of the stud, and the shuttle being located with respect to the screw and stud so that during screw rotation the shuttle is forced forwardly by the advancing material into engagement with the stud nose in the open position for the valve and so that the screw is thrust forwardly the corresponding diameter rear porton of the stud slides into the inside diameter of the shuttle to close the valve against flow of the material rearwardly of the advancing screw.

2. The improvement defined in claim 1 further characterized by a fixed torpedo member mounted in the forward end of said barrel bore, said torpedo member having circumaxially spaced fins which define passageways to spread the thermoplastic material and a central portion for forcing the material outwardly into proximity to the barrel wall whereby the material to be injected through the nozzle is heated in the barrel at least in the area of said torpedo member.

* * * * *

UNITED STATES PATENT OFFICE
CERTIFICATE OF CORRECTION

Patent No. 4,065,108           Dated December 27, 1977

Inventor(s) Bernie A. Olmsted

It is certified that error appears in the above-identified patent and that said Letters Patent are hereby corrected as shown below:

Col. 2, line 15, "spreader of" should be --spreader or--.

Col. 2, line 28, "sectonal" should be --sectional--.

Col. 2, line 51, "or" should be --of--.

Col. 4, line 7, "paritally" should be --partially--.

Col. 5, line 5, "that the screw" should be --that as the screw--.

Col. 5, line 7, "porton" should be --portion--.

Signed and Sealed this

Ninth Day of May 1978

[SEAL]

Attest:

RUTH C. MASON
Attesting Officer

LUTRELLE F. PARKER
Acting Commissioner of Patents and Trademarks